UNITED STATES PATENT OFFICE.

LAWRENCE V. REDMAN, OF EVANSTON, AND ARCHIE J. WEITH AND FRANK P. BROCK, OF CHICAGO, ILLINOIS, ASSIGNORS TO REDMANOL CHEMICAL PRODUCTS COMPANY, OF CHICAGO, ILLINOIS, A CORPORATION OF WEST VIRGINIA.

PROCESS OF PRODUCING A PHENOLIC CONDENSATION PRODUCT.

1,345,694.　　　　　Specification of Letters Patent.　　Patented July 6, 1920.

No Drawing. Application filed September 16, 1918, Serial No. 254,369. Renewed May 12, 1919. Serial No. 296,537.

*To all whom it may concern:*

Be it known that we, LAWRENCE V. REDMAN, a citizen of Canada, (who has taken out his first papers for citizenship in the United States,) a resident of Evanston, Cook county, Illinois, and ARCHIE J. WEITH and FRANK P. BROCK, citizens of the United States, residing at Chicago, in the county of Cook and State of Illinois, have invented a new and useful Improvement in Processes of Producing a Phenolic Condensation Product, of which the following is a specification.

This invention relates to a simple process for producing a phenolic condensation product from a formaldehyde solution and a phenolic body.

The primary object is to provide a simple process of producing without the use of a cataylzer, a transparent or semi-transparent phenolic condensation product of the character indicated, which is free from deleterious substances and which possesses the finest qualities.

The preferred method is as follows:

Boil together at atmospheric pressure, for a period of from 60 to 120 hours, 3 parts of a 40 per cent. solution of formaldehyde ($CH_2O$) and 5 parts of phenol ($C_6H_5OH$), the temperature being from 98° C. to about 100° C. or slightly higher, thus producing a lower layer comprising a viscous creamy mass and a supernatant aqueous layer; discard the aqueous layer, after it becomes free, or practically free from formaldehyde, and pour or discharge the viscous mass into an evaporator; concentrate the mass by further heating until the temperature rises to about 115° C. or somewhat higher; then allow it to cool to about 90° C. and stir into or mix with the mass one part of a 40 per cent. formaldehyde solution (one third the amount originally employed); then pour into molds and heat at a temperature below 100° C. and preferably somewhat above 50° C. until the material becomes sufficiently firm or "set" to permit discharge from the molds, this treatment usually requiring a period of from one to several days; and then remove from the molds and subject to heat treatment for a prolonged period at a temperature below 100° C. and preferably somewhat above 50° C. until the material becomes hard, resistant and substantially insoluble and anhydrous. This treatment usually extends over a period of several weeks and may require several months, depending upon the materials used, the volume of the mass, the degree of heat applied etc.

An experienced workman is able to judge from the appearance when the first boiling has continued long enough. It may be stated, however, that where such a large excess of the phenolic body over the methylene body is used the mass will not gelatinize but may be poured with facility at a temperature of approximately 100° C.

The first reaction is sufficiently complete when the supernatant aqueous layer becomes free, or approximately free, from formaldehyde.

To produce a high-grade product with a fine color, it is desirable to employ either pure phenol, or a phenolic body comprising phenol, and a relatively small proportion of its homologs. Where ordinary commercial cresol is employed, a dark colored product is obtained, but the period of boiling is shortened so as to require from about four to twelve hours. In case of crude cresol, the period may be shortened to two hours.

If it be desired to expedite the reaction, as where pure phenol, or approximately pure phenol, is used, this may be accomplished by closing the still or reflux condenser and allowing the pressure to increase until the temperature is above 100° C. and preferably about 125° C. or higher. In this manner, the time of boiling in producing the product from phenol may be reduced so as to cover a period of from 12 to 18 hours. The proportions stated may be either by volume or weight.

After the reaction is complete, the water is poured off or discarded, and the resinous mass is poured or discharged into a tub or evaporator, fitted with a stirrer, where the additional formaldehyde is introduced. If desired, a relatively small proportion of hexamethylenetetramin may be added to the formaldehyde in the second step of the process. $\frac{1}{10}$ of one per cent. of hexamethylenetetramin added to the formaldehyde in the solution in the second step of the process will enable the product to "set" more quickly.

Where phenol is employed in making the product, the product is of yellow or amber color, but may contain a tinge of orange or red. This may be eliminated and a pale clear amber or light lemon color produced by subjecting the product, after it has undergone prolonged heat treatment at a moderate temperature in the manner noted above, to a relatively short period of heat treatment at a temperature exceeding 100° C. and preferably approximately 125° C. The temperature may exceed 125° C., but ordinarily it is not necessary to exceed 150° C. The product produced by the prolonged mild heat treatment is hard and substantially insoluble. However, by subjecting the product to heat treatment at a higher temperature, not only is the color improved, but the other qualities are improved, the material acquiring greater tenacity, a finer temper and being capable of being more easily worked, as in sawing, machining, sandpapering and buffing. It is probable that some colloidal change takes place in the material during this treatment which improves the product, giving it a finer color, a better temper and increased tensile strength.

If desired, the resinous mass may be concentrated somewhat by a further heating after the aqueous layer has been discarded and before the mass is poured into the molds. Coloring materials may be added or stirred into the mass, as, for instance, auramin, to produce deep amber color; methyl violet, to produce amethyst; acetyl red, to produce "dregs of wine," etc. Small quantities of these colors, not to exceed ½ of one per cent. of the mass will suffice. Oils or waxes, to produce opaque materials, and ground mica or fish-scales, to produce a shimmering effect, may be employed.

The material, after this final heat treatment, will not gum the sandpaper readily, and its qualities generally are improved. It may be stated, however, that the material, previous to this final heat treatment, is suitable for use in making pipes, pipe-stems, cigar-holders, cigarette-holders, etc., but a much finer product is obtained when the final heat treatment is given.

It is desirable to employ the phenolic body and the methylene body in such proportions as to approach equimolecular proportions, but preferably some excess of phenol is employed, so that the final product will correspond with the union, say, of 6 methylene groups to about 6⅓ to 7½ phenolic groups.

The concentration may be performed *in vacuo*, if desired; and the hardening operation may be performed at atmospheric pressure, or at higher pressure, or at reduced pressure, or *in vacuo*.

The foregoing detailed description has been given for clearness of understanding only, and no unnecessary limitation should be understood therefrom, but the appended claims should be construed as broadly as permissible, in view of the prior art.

What we regard as new and desire to secure by Letters Patent is—

1. The process of producing a phenolic condensation product, without the use of a condensing agent, which comprises: boiling together a solution of formaldehyde and a phenolic body taken largely in excess of the formaldehyde, until the formaldehyde is substantially eliminated from the supernatant aqueous layer which forms and a viscous gummy lower layer is produced; discarding the aqueous layer; concentrating the gummy mass by applying further heat; mixing with the mass a solution of formaldehyde in lesser proportion than in the first step; pouring the mixture into molds and "setting" at a temperature below 100° C.; and removing the material from the molds and hardening by prolonged application of heat at a temperature below 100° C. until the mass becomes infusible and substantially insoluble.

2. The process of producing a phenolic condensation product, without the use of a condensing agent, which comprises: boiling together approximately 3 parts of a 40 per cent. solution of formaldehyde and 5 parts of a phenolic body until the formaldehyde is substantially eliminated from the supernatant aqueous layer which forms and a viscous gummy lower layer is produced; discarding the aqueous layer; concentrating the gummy mass by boiling at a temperature above 100° C.; allowing the same to cool below 100° C. and mixing therewith a solution of formaldehyde in amount equal to about one-third of the amount employed in the first step; and hardening the mass by prolonged heat treatment at a temperature below 100° C. until the mass becomes infusible and substantially insoluble.

3. The process of producing a phenolic condensation product, without the use of a condensing agent, which comprises: boiling together a solution of formaldehyde and a phenolic body taken largely in excess of the phenolic body, until the formaldehyde is substantially eliminated from the supernatant aqueous layer which forms and a viscous gummy lower layer is produced; discarding the aqueous layer; concentrating the gummy mass by boiling; mixing with the concentrated mass a relatively small proportion of a solution of formaldehyde; subjecting the mass to heat treatment for a prolonged period at a temperature below 100° C. until the material becomes hard and substantially insoluble and anhydrous; and then subjecting the material to heat treatment at a temperature exceeding 100° C. for a relatively short period.

4. The process of producing a phenolic condensation product, without the use of a condensing agent, which comprises; boiling together a solution of formaldehyde and a phenolic body taken largely in excess of the formaldehyde, until the formaldehyde is substantially eliminated from the supernatant aqueous layer which forms and a viscous gummy lower layer is produced; discarding the aqueous layer; concentrating, by further application of heat, the gummy mass; mixing with the concentrated mass a relatively small proportion of a solution of formaldehyde and a minute percentage of hexamethylenetetramin; pouring the mass into molds and "setting" at a temperature below 100° C.; and removing the material from the molds and subjecting the same to prolonged heat treatment at a temperature below 100° C. until the material becomes hard and substantially insoluble and anhydrous.

LAWRENCE V. REDMAN.
ARCHIE J. WEITH.
FRANK P. BROCK.